United States Patent [19]

Gallo

[11] 4,122,492
[45] Oct. 24, 1978

[54] DC RESTORATION UTILIZING THE COLOR BURST SIGNAL
[75] Inventor: Luigi C. Gallo, Redwood City, Calif.
[73] Assignee: Ampex Corporation, Redwood City, Calif.
[21] Appl. No.: 763,461
[22] Filed: Jan. 28, 1977
[51] Int. Cl.² .......................................... H04N 9/535
[52] U.S. Cl. .................................................. 358/34
[58] Field of Search ................................. 358/34, 172

[56] References Cited
U.S. PATENT DOCUMENTS 2,843,666  7/1958  Preisig ..................................... 358/34
3,207,998  9/1965  Corney et al. ........................ 358/172

FOREIGN PATENT DOCUMENTS
902,475  8/1962  United Kingdom ..................... 358/172

OTHER PUBLICATIONS
Dennison, "Color TV Signal DC Reinsertion Clamp Circuit," RCA Technical Note, No. 60, Received 12-2-57.

Primary Examiner—John C. Martin
Attorney, Agent, or Firm—Robert G. Clay; Ralph L. Mossino

[57] ABSTRACT

A method and apparatus is disclosed for restoring the d.c. level of a composite video signal which has a burst of chrominance subcarrier cycles occuring in the horizontal blanking period. The d.c. level of the signal is measured using integrating techniques for a period that corresponds to a whole number of cycles of the chrominance subcarrier and the measured level is used to generate an error signal for adjusting the level to the proper volume. By using a precise whole number of cycles during integration, the d.c. level can be accurately measured.

19 Claims, 5 Drawing Figures

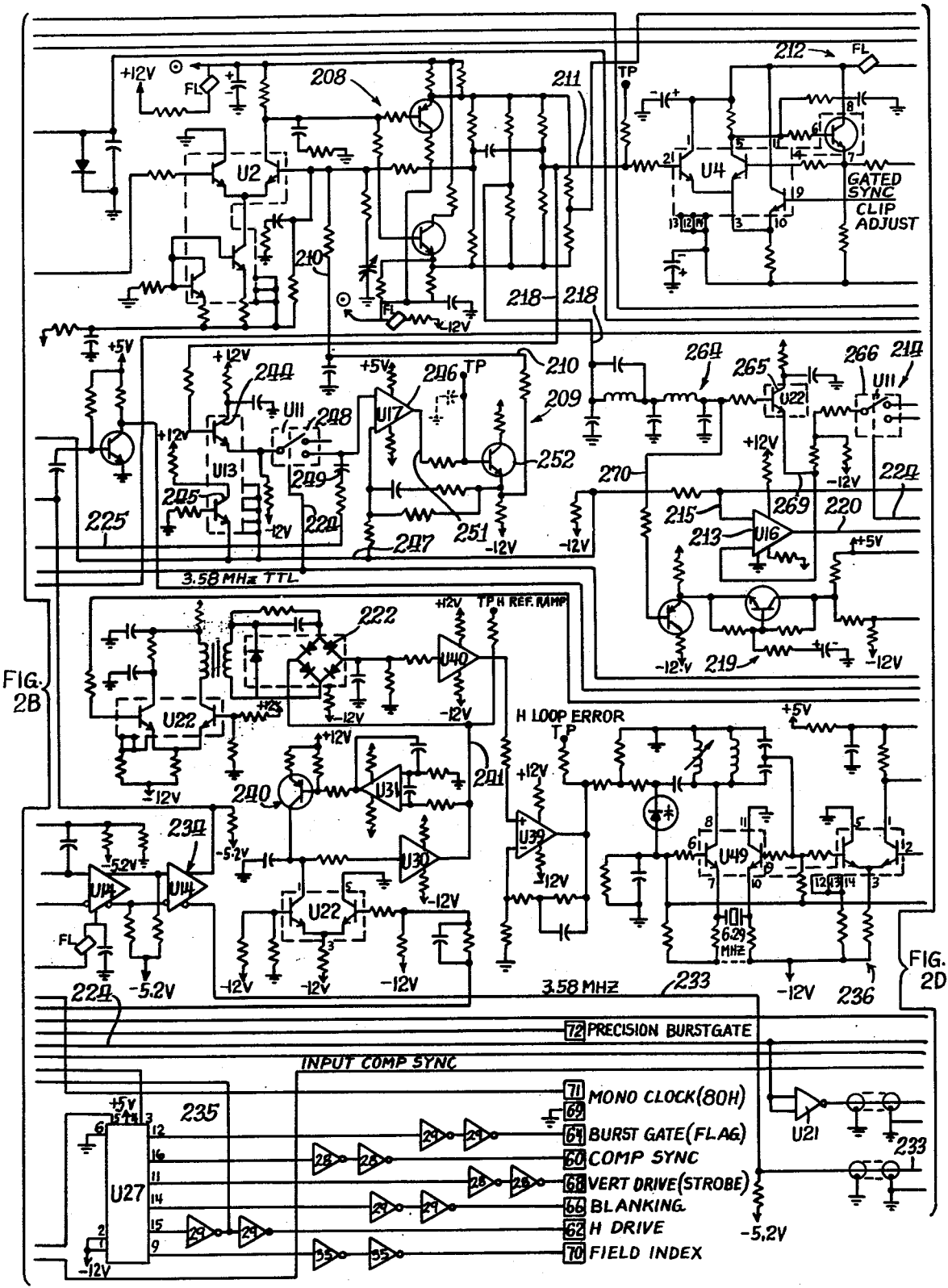

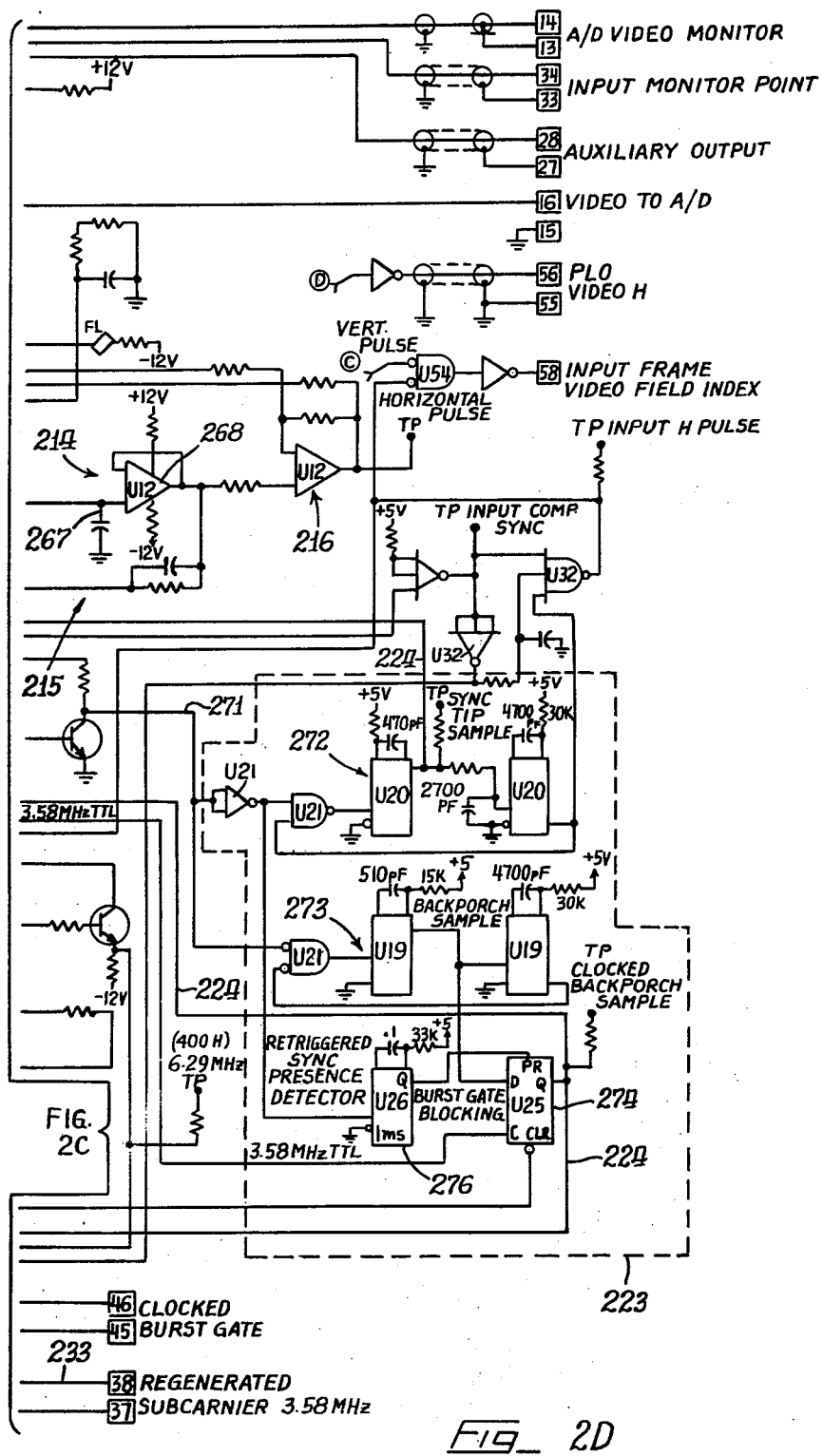
FIG_ 2D

DC RESTORATION UTILIZING THE COLOR BURST SIGNAL

CROSS REFERENCE TO RELATED APPLICATIONS

VIDEO FRAME STORAGE RECORDING AND REPRODUCING APPARATUS, Ser. No. 763,371, filed Jan. 28, 1977, by Joachim P. Diermann and Thomas W. Ritchey, Jr.

PLAYBACK APPARATUS ASSIGNMENT MEANS, Ser. No. 763,462, filed Jan. 28, 1977, by Howard W. Knight and Edwin W. Engberg.

TELEVISION SIGNAL DISC DRIVE RECORDER, Ser. No. 763,795, filed Jan. 28, 1977, by Howard W. Knight and Edwin W. Engberg.

DISC DRIVE RECORDING PROTECTION APPARATUS, Ser. No. 763,761, filed Jan. 28, 1977, by Edwin W. Engberg.

TELEVISION SUBCARRIER PHASE CORRECTION FOR COLOR FIELD SEQUENCING, Ser. No. 763,942, filed Jan. 28, 1977 by Luigi C. Gallo.

METHOD AND APPARATUS FOR INSERTING SYNCHRONIZING WORDS IN DIGITIZED TELEVISION SIGNAL DATA STREAM, Ser. No. 763,463, filed Jan. 28, 1977, by Luigi C. Gallo.

PRECISION PHASE CONTROLLED CLOCK FOR SAMPLING TELEVISION SIGNALS, Ser. No. 763, 453, filed Jan. 28, 1977, by Daniel A. Beaulier, Luigi C. Gallo.

DIGITAL TELEVISION SIGNAL PROCESSING SYSTEM, Ser. No. 763,941, filed Jan. 28, 1977, by Luigi C. Gallo.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo.

PHASE LOCK LOOP FOR DATA DECODER CLOCK GENERATOR, Ser. No. 763,793, filed Jan. 28, 1977, by Kenneth Louth and Luigi C. Gallo.

A CIRCUIT FOR DIGITALLY ENCODING AN ANALOG TELEVISION SIGNAL, Ser. No. 762,901, filed Jan. 26, 1977, by Daniel A. Beaulier.

HIGH BIT RATE DATA ENCODER FOR DATA TRANSMISSION SYSTEM, Ser. No. 763,763, filed Jan. 28, 1977, by Luigi C. Gallo.

DATA RATE AND TIME BASE CORRECTOR, Ser. No. 763,794, filed Jan. 28, 1977, by Luuigi C. Gallo A DIGITAL CHROMINANCE SEPARATING AND PROCESSING SYSTEM AND METHOD, Ser. No. 763,251, filed Jan. 26, 1977, by Robert P. MacKenzie.

FREQUENCY RESPONSE EQUALIZER, Ser. No. 762,902, filed Jan. 26, 1977, by Jerry W. Miller and Luigi C. Gallo.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Sheikh.

BACKGROUND AND FIELD OF THE INVENTION

The present invention generally relates to recording and reproducing apparatus and, more particularly, to apparatus that is adapted to record and reproduce television signals, using digital techniques.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total gile on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Morever, following their use during broadcasting, the slides must be removed and returned to the file. The entire assembling, use and refiling of the slides represent a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the present invention described herein facilitates the use of a recording and playback apparatus that will record and reproduce still images, with the still image video information being stored on magnetic media. The magnetic recording and playback apparatus utilizes generally standard computer disc drives (though modified in some respects as will be described) as the magnetic storage media and thereby eliminates the many problems that are associated with slide transparencies. Since the still images are recorded on magnetic media, the problems of physical degradation during use, e.g., dust particles and scratches, are not experienced. Moreover, since the recorded information can be easily accessed, the same still image may be used by operators at different locations almost simultaneously.

As will be described in detail herein, the composite color video information signal that is applied to the recording and reproducing machine disclosed herein undergoes a number of processing steps, including such initial steps as amplifying the signal, providing DC restoration of the same, detecting the level of the tip of the horizontal synchronization pulse and clipping the same, as well as separating the horizontal synchronization for use in producing a regenerated synchronization signal and producing a regenerated subcarrier signal that is preferably derived from the chrominance subcarrier burst component present in the signal.

The present invention is directed to a method and apparatus for providing the DC restoration of the analog video signal and does so by generating an error signal for an amplifier through which the video signal passes wherein the error signal is produced by examining the DC level of the composite video signal during the presence of the chrominance subcarrier burst component that occurs in the horizontal blanking intervals. THe DC level of the signal is measured using integration techniques and the integration is performed over a precise whole number of cycles of the subcarrier. This eliminates the need for low pass filtering the video signal to remove the burst before the clamping is performed.

OBJECTS OF THE INVENTION

Accordingly, it is an object of the present invention to provide an improved method and apparatus for restoring the DC level of a composite video signal having a burst of cycles of chrominance subcarrier.

It is another object of the present invention to provide an improved method and apparatus for restoring the DC level of a composite video signal having a burst of cycles of chrominance subcarrier using integration techniques wherein the integration occurs over a precise whole number of cycles of the subcarrier so that the average value of the burst being measured is accurately determined.

Other objects and advantages will become apparent upon reading the following detailed description in conjunction with the attached drawings.

DESCRIPTION OF THE DRAWINGS

FIGS. 2A, 2B, 2C and 2D together comprise an electrical schematic diagram of the input circuitry of the signal system shown in the block diagram of FIG. 1.

A composite color video information signal that is to be provided to a utilization device, such as a video record and/or reproduce apparatus, typically undergoes a number of processing steps prior to its being made available for utilization. Included in the processing steps is the DC restoration of the video signal to re-establish the standard DC reference levels in the video signal before providing the signal to the utilization device. Ordinarily, the DC restoration process is performed at an input stage of the utilization device.

Figure 1:
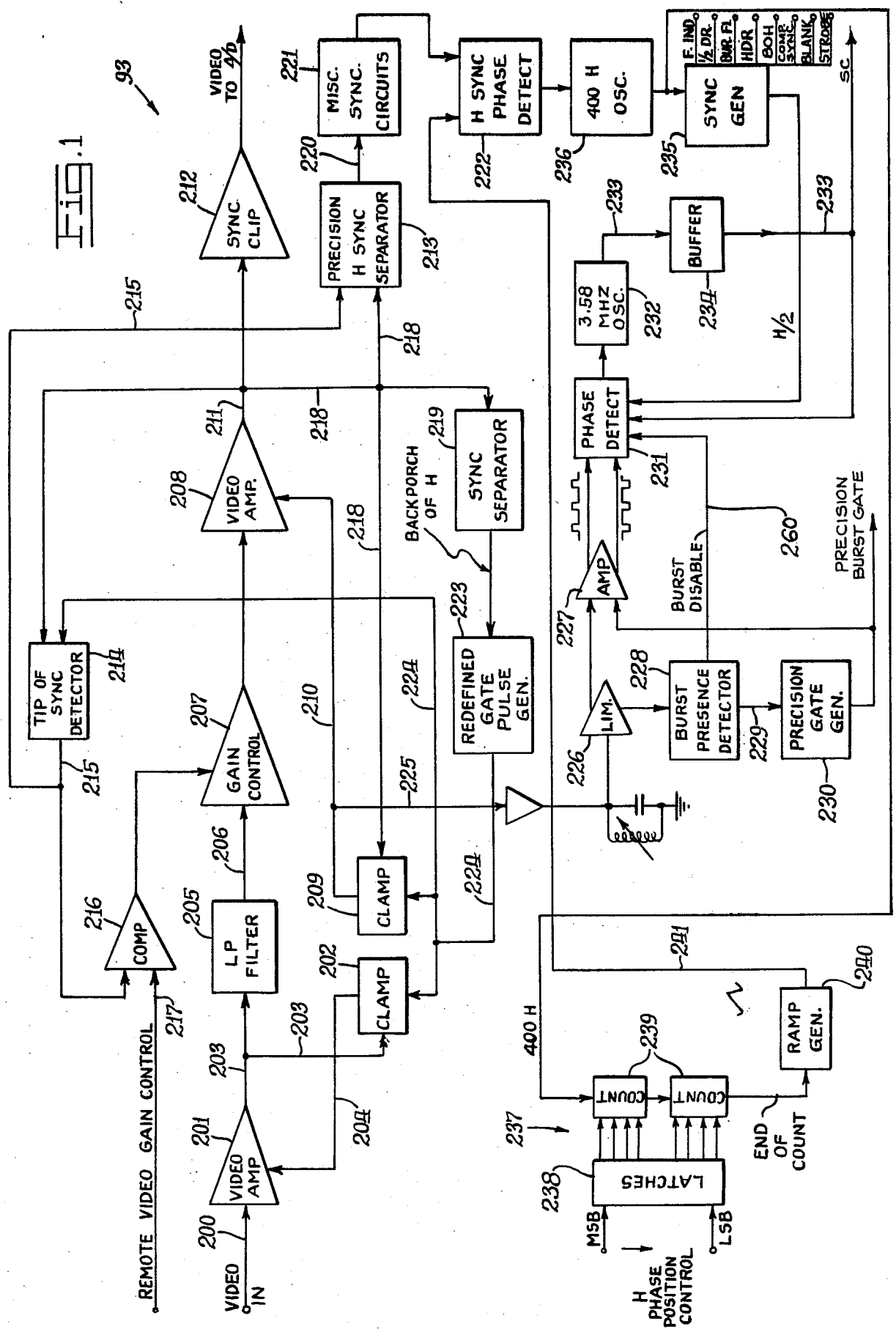
FIG. 1 is a functional block diagram of the video input circuitry (substantially similar to the reference input circuitry)

Referring more specifically to the block diagram of the video input circuit shown in FIG. 1, the video signal is applied on line 200 into a video amplifier 201 which amplifies the signal and restores the DC component through a clamp 202. The clamp 202 samples the output of the amplifier on line 203 and produces a DC component on line 204 that extends to the amplifier 201. The DC restored video signal on line 203 is then passed through a low pass filter 205, the output of which appears on line 206 extending to a video gain control amplifier 207. The amplifier 207 is connected to another video amplifier 208 where a second clamp circuit 209 assures that the blanking level of the signal is at ground level by the application of a DC control signal via the line 210 to the video amplifier 208. The output of the video amplifier appears on line 211 and is coupled by one of the lines 218 extending therefrom to the sampling input of the clamp 209. Line 211 also extends to a gated sync clipping circuit 212 as well as to a precision sync separator 213. A tip of sync detector 214 detects the level of the tip of sync and provides a corresponding signal level on line 215 that extends to a comparator 216 as well as to the precision sync separator 213. In the video input circuitry, a remote video gain control signal on line 217 is also applied to the comparator 216 for controlling the gain control amplifier 207 from a remote, if desired location. The output of the tip of sync detector 214, which may contain alternating current ripple, is applied to one input of the precision H sync separator 213 while the other input to the separator is provided by one of lines 218 that extends from the output of the video amplifier 208. The two inputs to the precision sync separator 213 will both have AC ripple thereon if present in the signal and, accordingly, they are common moded so that the separator produces an AC ripple-free precision separated sync on line 220 that is applied to miscellaneous sync circuits 221 and to an input of a horizontal sync phase detector 222. Another of the lines 218 from the output of the video amplifier 208 extends to a less precise sync separator 219 that produces a generally less precise separated sync signal which is applied to a gate pulse generator 223, outputs of which appear on lines 224 that extend to both clamps 202 and 209 as well as to the tip of sync detector 214. When the horizontal sync signal is detected and separated, a gate is produced by the pulse generator 223 which closes the clamps as well as the sync tip detector at the appropriate time during horizontal blanking.

The clamp 209 is closed during burst time for a whole, integral number of cycles, rather than an arbitrary period, so that the blanking level of the video signal can be accurately obtained using integration techniques as will now be described in detail. The burst appears on line 225 which is applied to a burst limiter circuit 226 that is in turn connected to an amplifier 227 providing complementary outputs of the limited burst input. The output of the limiter circuit 226 is also connected to a burst presence detector circuit 228 having an output on line 229 that extends to a precision gate generator 230 as well as an output on line 260 that extends to a phase detector 231. When the presence of burst is detected, the precision gate generator 230 generates a precision burst gate signal that is coupled to enable the amplifier 227 and permit it to pass the middle three cycles of burst to apply them to the phase detector 231. The phase detector responsively provides an error signal to a voltage controlled oscillator 232 that reflects the difference in phase between the output of the oscillator and the phase of the burst cycles from the amplifier 227. The effect of the phase detector circuit controlling the oscillator 232 is to correct for longer term changes and not short term changes in the phase of the three cycles of burst that are used on every line as the subcarrier reference. The output of the oscillator 232 appears on line 233 after having been buffered by a buffer 234. The output of the oscillator is a continuous regenerated subcarrier signal SC (3.58 MHz) that is phase locked to the color burst when burst is present. However, in the event that the burst detector circuit 228 fails to detect burst, then the phase detector 231 compares the phase of an H/2 signal with the regenerated subcarrier output of the oscillator 232, the H/2 signal being produced by a sinc generator 235 from an oscillator 236 that is controlled by the horizontal sync phase detector 222.

A horizontal phase position control, indicated generally at 237, may be provided, if desired, to adjust the horizontal positioning of the regenerated sync. An 8 bit binary number is loaded into latches 238 by an operator controlled thumb wheel switch or the like to preset a counter 239 which is clocked by a 400H clock derived from the oscillator 236. When the counter reaches its terminal count, it triggers a ramp generator 240 having an output 241 which extends to a second input of the H sync phase detector 222. Thus, by adjusting the latches, up to plus or minus 20 microseconds can be inserted in the feedback loop on line 241 and the phase of the regenerated sync signal can be adjusted for horizontal positioning of the video image represented by the video information signal. Since a delay in the feedback loop means that the regenerated sync will be advanced, the horizontal position control can effectively advance the video information signal to compensate for propagation delays during transmission of a signal through cabling in a television station.

The output of the oscillator 236 also is used by the sync generator 235, which is of conventional design for television signal processing equipment, to generate the various vertical and horizontal sync rate related signals indicated in FIG. 1. These sync rate related signals are generated with respect to the phase of the precisely regenerated H sync as provided by the phase detector 222 and, therefore, will always have a phase related to the input signal.

An important aspect of the circuitry shown in FIG. 1 is that the H sync of the video signal is clipped at precisely ½ its value and the level of the blanking is precisely clamped to ground. Since the clamp circuitry 209 examines for a zero average level of video at burst time using a clamping pulse which lasts precisely a whole number of cycles of burst, there is no need for low pass filtering the video and rejecting the burst before clamping is performed. This is due to the fact that resulting integration of the burst is equal to zero and there is no H/2 ripple introduced by integrating a signal that does not contain complete cycles of burst.

The block diagram shown in FIG. 1 describes the functional operation of the input circuitry and specific circuitry which can be used to carry out the operation thereof is shown in FIGS. 2A through 2D which together comprise a single circuit diagram for the input processing circuitry.

With respect to the operation of the clamp 209 (see FIG. 2C), the voltage at the output of the amplifier 208 appears on lines 211 and 218, one of the latter of which extends downwardly to the base of an emitter follower transistor 244 that provides a voltage drop. Under equilibrium conditions, the blanking level of the video signal appearing on line 218 will be at ground potential. This signal is shifted by about 0.7V toward the negative as a result of the voltage drop through the emitter follower 244. A matching emitter follower transistor 245 with its emitter connected to the negative input of a differential amplifier 246 by line 247 shifts the comparison level (ground) toward the negative as does transistor 244.

Figure 2A:
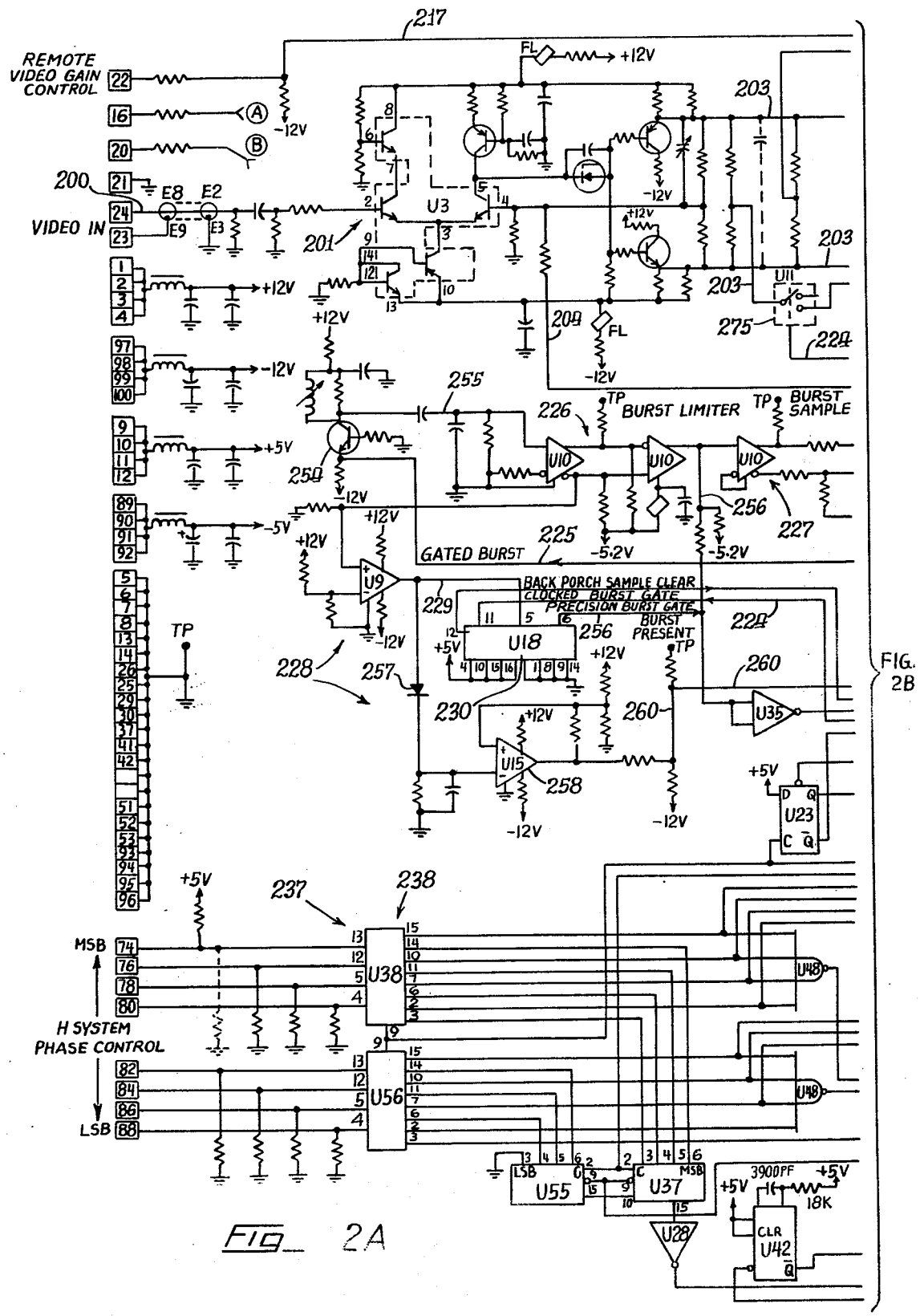
Figure 2B:
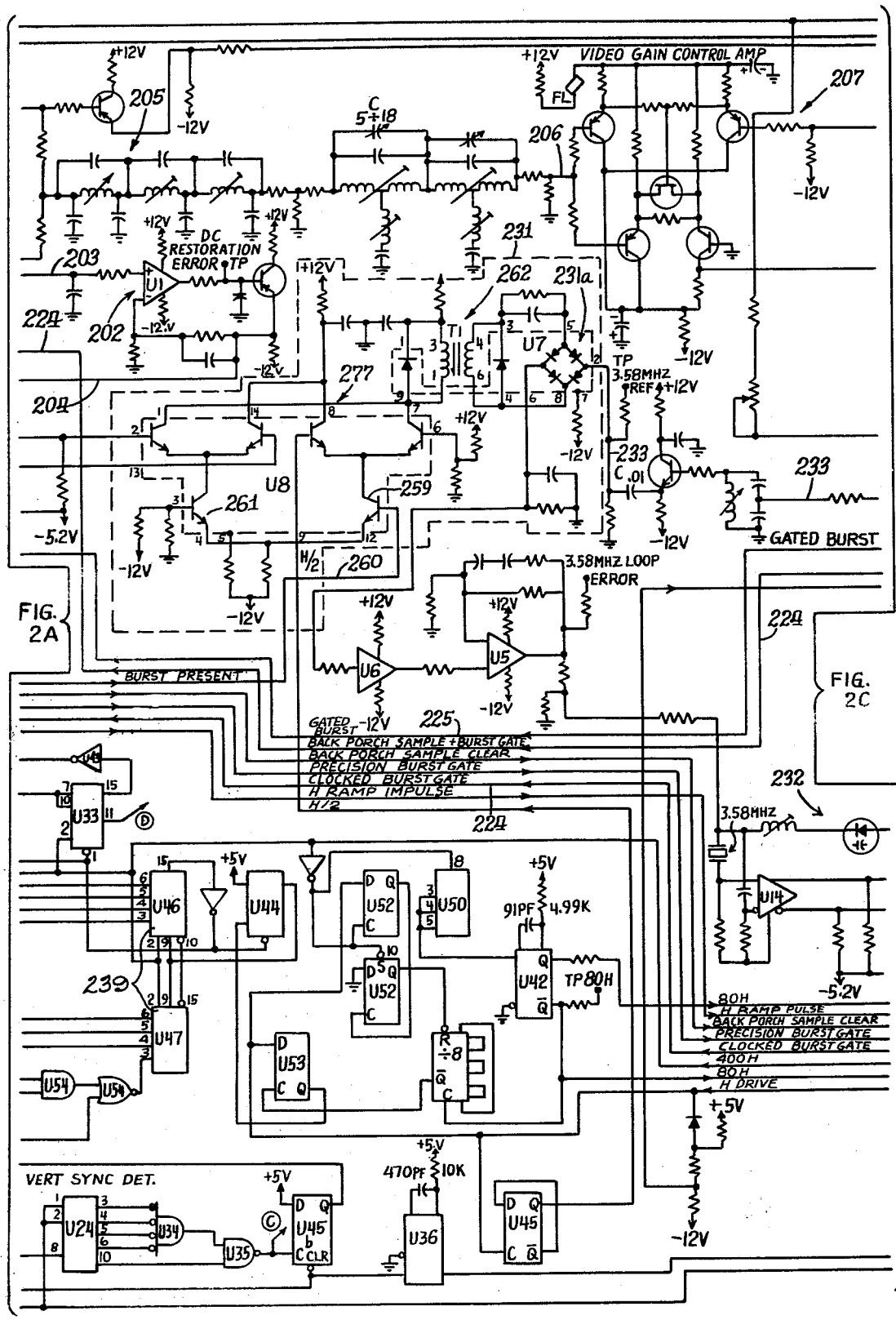

The emitter of the transistor 244 is connected to the positive input of the differential amplifier 246 when a transmission gate or switch 248 is closed during and for a whole number of cycles of burst by a signal on the line 224 that is produced by the redefined gate pulse generator 223 shown in FIG. 2D. Thus, during the burst time, switch 248 is closed charging a capacitor 249 to the average level of the burst. The switch is closed for an integral number of cycles of the subcarrier. This eliminates the need for low pass filtering the video to remove the burst before the clamping is performed, which is ordinarily done in the prior art in order to eliminate H/2 modulation of the clamping level. The charge on the capacitor 249 reflects exactly the average value of the burst and the differential amplifier 246 output represents an error that is applied to the video amplifier 208 through line 251, transistor 252 and line 210 which is connected to the emitter of the transistor 252. The blanking level of the signal on line 211 is thus held very close to ground due to the high DC gain of the differential amplifier 246. The operation of the clamp 202 is substantially similar to the operation of the clamp 209 and is shown in FIGS. 2A and 2B.

Referring again to FIG. 2C, the closing of the switch 248 gates burst through the switch into capacitor 249 and onto line 225 which extends leftwardly to FIG. 2A which is connected to the emitter of a transistor 254 and the burst therefore appears on the collector and on line 255 that extends to the burst limiter circuit 226. When burst is present, the burst presence detector circuit 228 provides a limited burst signal on its output line 229 that clocks the precision gate generator 230. A counter is employed as the precision gate generator and counts cycles of the limited burst signal and produces a precision burst gate during the middle three cycles of the nine to eleven cycle burst interval that is coupled by line 256 to enable the amplifier 227. Therefore, except for the middle three cycles of burst, the amplifier 227 is disabled by the output of the precision gate generator 230. When burst is present, the diode detector 257 and following latch circuit 258 of the detector circuit 228 provides a more negative level on line 260 extending to a switching transistor 259 (FIG. 2B) of the phase detector 231. When burst is present, switching transistor 259 is shut off and another switching transistor 261 of the detector 231 is turned on. When transistor 261 is on, the three cycles of burst from the amplifier 227 is applied by the driver 277 to a transformer 262 of the detector 231. The driver is in turn connected to the phase comparator 231a for comparing the phase of the burst with the phase of the output of the 3.58 MHz (SC) oscillator 232 that is present on line 233. When burst is not detected by the detector circuit 228, transistor 259 is switched on, which applies the signal H/2 to the other input of the driver 277 that is also connected to the transformer 262 and the phase of the oscillator output on line 233 is compared with the phase of the H/2 signal.

Turning now to the detailed circuitry for performing the precision H sync separation and referring to FIG. 2C, the sync is taken from the amplifier 208 on the line 218 extending to a low pass filter 264 whose output is coupled to the base of a transistor 265. The emitter of transistor 265 is connected to a transmission gate or switch 266 that is closed during the presence of sync by control line 224. The level of the sync is determined by charging a following capacitor 267 (FIG. 2D), which is buffered by a unity gain amplifier 268, and ½ of the DC level of the tip of sync together with the full level of AC ripple present in the signal is then applied via line 215 to one input of sync separation 213, the other of which is supplied by line 269 that comes from the emitter follower transistor 265. In the embodiment of the video input circuitry illustrated in FIGS. 2A-D, the precision H sync separator 213 is a comparator. In this manner, the output on line 220 is a separated sync whose timing is not affected by AC ripple on the video, because any AC ripple will appear on both inputs of the comparator 213 and will be prevented from appearing in the output of the comparator because of common mode rejection. The sync appearing on line 220 is a precision sync that is used by other parts of the video signal utilization device.

A less precise separated sync is also developed by taking the sync from the low pass filter 264 via line 270 to the imprecise sync separator 219, the output of which appears on line 271 that is applied to the gate pulse generator 223 which includes a one shot serving as a sync presence detector 276. The upper circuit, indicated generally at 272, generates a gate for use by the switch 266 to close the switch during the presence of sync, a circuit 273 produces a backporch sample and a circuit 274 redefines with respect to SC phase a burst gate signal. With respect to the generator 223, it should be appreciated that if no sync is present and therefore does not appear on line 271 from the imprecise sync detector 219, the sync presence detector 276 will through circuit 274 close the switch 248 in the clamp circuit 209 as well as a similar switch 275 in the clamp 202 so that all clamps operate on a DC feedback loop rather than permitting them to remain open. Thus, if sync is not present, the level on line 224 is placed high until sync returns and is detected. In addition, as a precautionary measure in the event the precision gate generator 230 does not receive the necessary number of burst cycles to clock it to its terminal state or count after its count cycle has been initiated, the detector 276 is coupled through circuit 274 to provide the burst gate signal to the precision gate generator 230 to assure termination of its count cycle and provision of the precision burst gate signal. This assures that the precision gate generator 230 will always properly respond to every input burst signal.

What is claimed is:

1. Apparatus for restoring the d.c. level of a composite video signal having a plurality of cycles of chrominance subcarrier occurring subsequently of the horizontal synchronization pulse within the horizontal blanking interval, comprising:
    means for adjusting the d.c. level of said video signal in response to a correcting signal applied thereto;
    means for integrating said video signal to determine the average value of said signal, and for providing said correcting signal to said adjusting means, said integrating means being operative when an enabling signal is applied thereto;
    means for producing said enabling signal, said enabling signal producing means being responsive to the presence of said horizontal synchronization pulse and providing said enabling signal for a predetermined time period occurring when said cycles of chrominance subcarrier are present, said time period corresponding to a whole number of selected cycles of said chrominance subcarrier intermediate of its interval.

2. Apparatus as defined in claim 1 wherein said integrating means comprises an integrating capacitor having said video signal applied thereto, the charge on said capacitor reflecting the average value of said video signal for the time period in which the video signal is applied thereto.

3. Apparatus as defined in claim 2 wherein said integrating means further includes switching means adapted to pass said video signal to said integrating capacitor, said switching means passing said signal thereto when said enabling signal is applied and blocking said video signal when said enabling signal is not applied.

4. Apparatus as defined in claim 3 wherein said switching means comprises an electronic transmission gate having a control input upon which said enabling signal is applied, the presence of said enabling signal placing said transmission gate into conduction for applying said video signal to said integrating capacitor.

5. Apparatus as defined in claim 3 wherein said integrating means further includes comparator means, said comparator means having one input thereof connected to said capacitor and a second input connected to a desired level, said comparator means providing said correcting signal that is proportional to the magnitude of the difference between said input signals.

6. Apparatus as defined in claim 5 wherein said comparator means comprises a differential amplifier.

7. Apparatus as defined in claim 1 wherein said enabling signal producing means comprises a monostable multivibrator that is actuated in response to the presence of a horizontal synchronization pulse, said monostable multivibrator producing said enabling signal on an output thereof, said enabling signal having a duration corresponding to said predetermined time period.

8. Apparatus for adjusting the d.c. level of a composite video signal to a predetermined level, said video signal having a horizontal blanking interval and a horizontal synchronization pulse followed by a burst of cycles of chrominance subcarrier within said horizontal blanking interval, comprising:
    means for detecting the presence of a horizontal synchronization pulse and for providing the switching control signal in response thereto, said switching control signal having a time duration corresponding to a precise whole number of said burst cycles intermediate of the burst interval;
    switching means for selectively passing said video signal to an integrating means, said switching means passing said video signal in response to said switching control signal being applied thereto;
    means for integrating said passed video signal to determine the average d.c. value of said signal during said whole number of burst cycles and providing said average value signals to a comparing means;
    means for comparing said average value signal with a desired value signal that is proportional to said predetermined level, said comparing means providing a correction signal having a magnitude proportional to the difference between said average value signal and said desired value signal and applying the same to a level adjusting means; and,
    means for adjusting the d.c. level so that the magnitude of said correction signal is reduced as the d.c. level of said video signal approaches said predetermined level.

9. Apparatus as defined in claim 8 wherein said detecting means comprising means for separating said horizontal synchronization pulse and producing a trigger signal in response to said horizontal synchronization pulse being detected.

10. Apparatus as defined in claim 9 wherein said detecting means further includes a monostable multivibrator having an input for receiving said trigger signal, said monostable multivibrator producing said switching control signal at the output thereof in response to said trigger signal being received.

11. Apparatus as defined in claim 8 wherein said switching means comprises an electronic transmission gate having a control input, said gate passing said video signal therethrough when said switching control signal is applied to said control input.

12. Apparatus as defined in claim 11 wherein said integrating means comprises an integrating capacitor connected to said transmission gate, said capacitor providing the average value of the signal applied thereto, said integrating capacitor being connected to said comparing means.

13. Apparatus as defined in claim 12 wherein said comparing means comprises an operation amplifier having one input connected to said capacitor and the other input receiving said desired value signal.

14. Apparatus as defined in claim 8 wherein said adjusting means comprises an amplifier adapted to adjust the d.c. level of said video signal in response to the magnitude of said correction signal being applied thereto.

15. A method of restoring the d.c. level of the composite video signal having a horizontal blanking interval and a horizontal synchronization pulse followed by a burst of cycles of chrominance subcarrier occurring within said blanking interval, comprising the steps of:
  measuring the d.c. level of said signal during said burst by integrating said signal for a precise whole number of said burst cycles intermediate of the burst interval;
  comparing said measured level with a predetermined level and generating an error correcting signal proportional to a difference between said levels;
  adjusting said d.c. level of said signal using said error correcting signal so that the difference between said levels is minimized.

16. A method of restoring the d.c. level of a video signal to a desired level, said video signal having a plurality of cycles of chrominance subcarrier occurring subsequently of the horizontal synchronization pulse within the horizontal blanking interval, comprising the steps of:
  integrating a number of complete cycles of chrominance subcarrier intermediate of its interval within each horizontal blanking interval of said video signal to provide an average d.c. value thereof;
  comparing said average d.c. value with a predetermined value and producing a correcting signal proportional to the difference between said values;
  adjusting the d.c. level of said video signal utilizing said correcting signal to thereby restore said d.c. level to its desired level.

17. A method as defined in claim 16 wherein said d.c. level is approximately at ground potential during the presence of said burst cycles.

18. A method of restoring the d.c. level of a composite video signal having a horizontal synchronization pulse followed by a burst of cycles of chrominance subcarrier whereby the d.c. level is restored to about zero during the presence of said burst cycles, comprising the steps of:
  detecting the presence of the horizontal synchronization pulse and generating a control signal for controlling a switching means for passing said video signal to an integrating means for a precise time period corresponding to a whole number of said burst cycles intermediate of the burst interval;
  passing said video signal through said switching means to said integrating means for said precise time period;
  integrating said video signal during said precise time period to derive the average d.c. level of said passed signal;
  comparing said average d.c. level with a desired level and providing a level correcting signal to a d.c. level adjusting means when said average d.c. level and said desired level are different;
  applying said level correcting signal to said d.c. level adjusting means and adjusting said d.c. level to about zero during the presence of said burst cycles.

19. A method as defined in claim 18 wherein said video signal is applied to an integrating capacitor which is charged to the average level of the video signal during said whole number of burst cycles.

* * * * *

UNITED STATES PATENT AND TRADEMARK OFFICE
CERTIFICATE OF CORRECTION

PATENT NO. : 4,122,492                                   Page 1 of 3
DATED     : October 24, 1978
INVENTOR(S) : Luigi C. Gallo It is certified that error appears in the above-identified patent and that said Letters Patent are hereby corrected as shown below:

IN THE SPECIFICATION

Column 1, line 13, after "Engberg" insert --, now abandoned--;

line 46, delete "763,763" and insert -- 763,762 --;

line 48, change "Luuigi" to --Luigi--;

line 48, after "Gallo" insert --, now abandoned.--;

line 52, after "MacKenzie" insert --abandoned in favor of continuation application, Serial No. 765,563, filed February 4, 1977--;

line 61, after "Sheikh" insert --abandoned in favor of continuation application, Serial No. 765,564, filed February 4, 1977--;

UNITED STATES PATENT AND TRADEMARK OFFICE
CERTIFICATE OF CORRECTION

PATENT NO. : 4,122,492

DATED : October 24, 1978

INVENTOR(S) : Luigi C. Gallo

It is certified that error appears in the above-identified patent and that said Letters Patent are hereby corrected as shown below:

IN THE SPECIFICATION

Column 5, line 54, after "the" insert --video--.

IN THE DRAWINGS

Sheet 1 of 5, FIG. 1, delete the junction terminal on line 210 extending between the blocks identified by reference numerals 209 and 208 and a portion of the vertical line 225 extending vertically downward from the junction terminal.

UNITED STATES PATENT AND TRADEMARK OFFICE
CERTIFICATE OF CORRECTION

PATENT NO. : 4,122,492

DATED : October 24, 1978

INVENTOR(S) : Luigi C. Gallo

It is certified that error appears in the above-identified patent and that said Letters Patent are hereby corrected as shown below:

Add a line extending from the top of the block identified by reference numeral 209 to the remaining portion of the vertical line 225.

Signed and Sealed this

Twenty-first Day of August 1979

[SEAL]

Attest:

Attesting Officer

LUTRELLE F. PARKER
*Acting Commissioner of Patents and Trademarks*